United States Patent [19]

Heintzman

[11] Patent Number: 5,224,553

[45] Date of Patent: Jul. 6, 1993

[54] BEARING PROTECTOR FOR A ROTARY HOE

[76] Inventor: Rick Heintzman, R.R. 1, Box 265, Onaka, S. Dak. 57466

[21] Appl. No.: 920,241

[22] Filed: Jul. 27, 1992

[51] Int. Cl.$^5$ ............................................. A01B 21/02
[52] U.S. Cl. ................................... 172/556; 277/95; 172/547; 172/688; 172/697
[58] Field of Search ............... 172/177, 518, 540, 544, 172/547, 550, 551, 556, 508, 687, 688, 694, 697, 776; 277/95; 384/140, 141, 482, 460, 479; 464/172

[56] References Cited

U.S. PATENT DOCUMENTS

| | | | |
|---|---|---|---|
| 307,809 | 11/1884 | Skillings | 172/547 |
| 321,906 | 7/1885 | McCormick | 172/547 X |
| 996,156 | 6/1911 | Spicer | 277/95 X |
| 2,522,231 | 9/1950 | Loftis | 277/95 X |
| 3,183,046 | 5/1965 | Hyland | 277/95 X |
| 3,608,646 | 9/1971 | Ryan | 172/500 |
| 3,734,201 | 5/1973 | Zaun | 172/551 |
| 4,095,808 | 6/1978 | Glasson | 277/81 R |
| 4,100,971 | 7/1978 | Honnold | 172/547 |
| 4,103,906 | 8/1978 | Gits | 277/88 |
| 4,194,575 | 3/1980 | Whalen |  |
| 4,241,793 | 12/1980 | Watkins | 172/551 |
| 4,398,608 | 8/1983 | Boetto | 172/551 |
| 4,415,041 | 11/1983 | Fackler | 172/551 |
| 4,425,972 | 1/1984 | Steinberg | 172/551 |
| 4,646,850 | 3/1987 | Brown et al. | 172/551 |
| 4,732,398 | 3/1988 | Biss | 277/212 FB |
| 4,760,806 | 8/1988 | Bigbee et al. | 111/135 X |
| 5,020,604 | 6/1991 | Peck | 172/551 |

*Primary Examiner*—David H. Corbin
*Assistant Examiner*—Spencer Warnick
*Attorney, Agent, or Firm*—Kinney & Lange

[57] ABSTRACT

An improvement for no-till rotary hoes to prevent trash from accumulating around a bearing of the rotary hoes thus destroying the bearing. An elongated axle mounts a hoe wheel distant from its corresponding support arm and in close proximity to an adjacent support arm, and the axle is protected by a spring-loaded protective sleeve which is spring loaded to provide a frictional seal against the bearing of the hoe wheel.

19 Claims, 6 Drawing Sheets

BEARING PROTECTOR FOR A ROTARY HOE

BACKGROUND OF THE INVENTION

The present invention relates to an improvement to rotary hoes and, more particularly, relates to a means for preventing trash and crop residue from accumulating around a bearing of a no-till rotary hoe, thus destroying the bearing.

Earth working implements such as rotary hoes used to break up the soil crust close to young plants or to cultivate the fields after plowing have been used for many years. Today, as more farmers utilize chisel plowing rather than moldboard plowing, grass, plant roots, barbed wire, twine, and other trash materials remain on the ground surface. Subsequently, when the ground is cultivated with rotary hoes, the surface trash not turned under during chisel plowing is picked up by the rotary hoes and wrapped around the hoe wheel axle.

When trash is wrapped around the hoe wheel axle, it is often wedged next to a bushing causing greatly accelerated wear on the bushing and bearing seal. In this condition, the bearing seal will fail in an accelerated time frame requiring the farmer to replace the hoe wheel. Oftentimes, rocks are lodged between tines of the hoe wheels. When a rock is trapped in the tines, or trash, barbed wire or twine is wrapped around the hoe wheel axle, the hoe wheel will lock. When the hoe wheels lock, the farmer or operator must stop operation and attempt to dislodge the rock or untangle the mess around the axle which means more down time for the farmer, which translates into lost money.

To reduce trash buildup on rotary hoes, it has been common practice to position frame-mounted stripper fingers near the rotary tine path so the trash can be stripped from the rotating tine members. The problem with stripper fingers is that they do not minimize trash buildup on hoe wheel axles. A method to remove trash lodged in the tines of the hoe wheels is disclosed in U.S. Pat. No. 4,100,971, but that structure does not protect the hoe wheel axle either.

Another common problem with previous rotary hoe systems is that rocks often get trapped in the tines of the hoe and then strike the support arm the hoe wheel is mounted from. When this occurs, the hoe wheel cannot rotate and the hoe wheel just plows a furrow in the field. This problem has been addressed somewhat in U.S. Pat. No. 4,415,041. A minimum till rotary hoe is disclosed showing the back row of hoe wheels being extended laterally from the corresponding support arm, which can be seen in FIG. 3 of U.S. Pat. No. 4,415,041. The minimum till rotary hoe described in this patent eliminates the problem of the rock striking its corresponding support arm thus causing a furrow to be dug, but it does not address a resulting problem. When a rock is lodged in the tines of the disclosed minimum till rotary hoe, the hoe wheel will tend to bounce and skip across the field because the rock will not permit the tines from properly penetrating the field. This will result in weeds being missed.

The need for an effective and long lasting rotary hoe has increased in recent years due to the renewed focus on the environment. It is recognized that farmers who take steps to improve their crop management practices also protect the health and safety of the food consuming public. Farmers clearly need to be involved in a vigorous effort to protect both ground water and surface water from contamination as a result of their farm management practices.

Farmers can greatly reduce the use of herbicides and in some cases eliminate them totally with the use of a rotary hoe. When herbicides are needed, they can be used in conjunction with the rotary hoe which will help the herbicide penetrate the soil and get to the roots of the weeds faster and directly thus allowing a greatly reduced amount of herbicide to be used. But farmers will not begin to use rotary hoes until the hoes can be cost effective for them to use. For a farmer to have to replace the bearings on his hoe wheels often is not practical, nor is having to stop operation to clean off the hoe wheels.

SUMMARY OF THE INVENTION

The improvement of the present invention is designed to protect the bearings and bushings mounting hoe wheels of a no-till rotary hoe onto an elongated axle and prolong the usefulness of the rotary hoe by placing a protective sleeve over the elongated axle. The sleeve is preferably spring loaded to frictionally abut the bearing of the hoe wheel. In a preferred embodiment of the present invention, the no-till rotary hoe has two rows of rotary hoe wheels having one row in advance of the other, where each wheel has an independent support arm. An elongated axle is used to space each hoe wheel laterally from its corresponding support arm beyond the center plane between its arm and the next adjacent arm so it is in close proximity with the next adjacent support arm. Moving each hoe wheel away from its corresponding support arm prevents rocks which lodge in tines of the hoe wheels from striking its own support arm and jamming, and because there is a greater space between the hoe wheel and the support arm, less trash will be packed into the space.

The protective sleeve is spring loaded to keep a positive seal against the bearing of the hoe wheel, thus reducing the problem with barbed wire, twine, or any other trash wedging and winding in and around the axle causing premature wear of the bearing seal. The protective sleeve also provides a dust and water resistant seal which helps protect the bearing seal from premature failure.

DETAILED DESCRIPTION OF THE PREFERRED EMBODIMENTS

Rotary hoes are typically used attached to a tractor-type towing vehicle by means of a hitch mechanism as shown and described in more detail in U.S. Pat. No. 4,194,575. Earth working implements such as rotary hoes have been used to break up the soil crust close to young plants or to cultivate the fields after plowing have been known for many years. Today, as more farmers utilize chisel plowing rather than moldboard plowing, grass, plant roots, barbed wire, twine, and other trash materials remain on the ground surface. Subsequently, when the ground is cultivated with rotary hoes, the surface trash not turned under during chisel plowing is picked up by the rotary hoes and wrapped around the hoe wheel axle.

Figure 1:
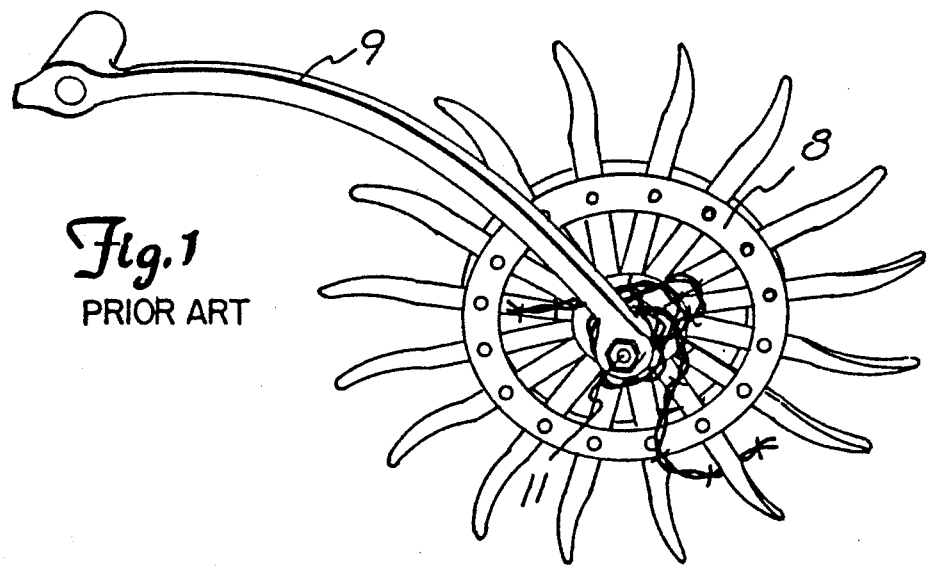
FIG. 1 is a side elevational view of a prior art rotary hoe wheel with barbed wire wrapped around an axle.
Figure 2:
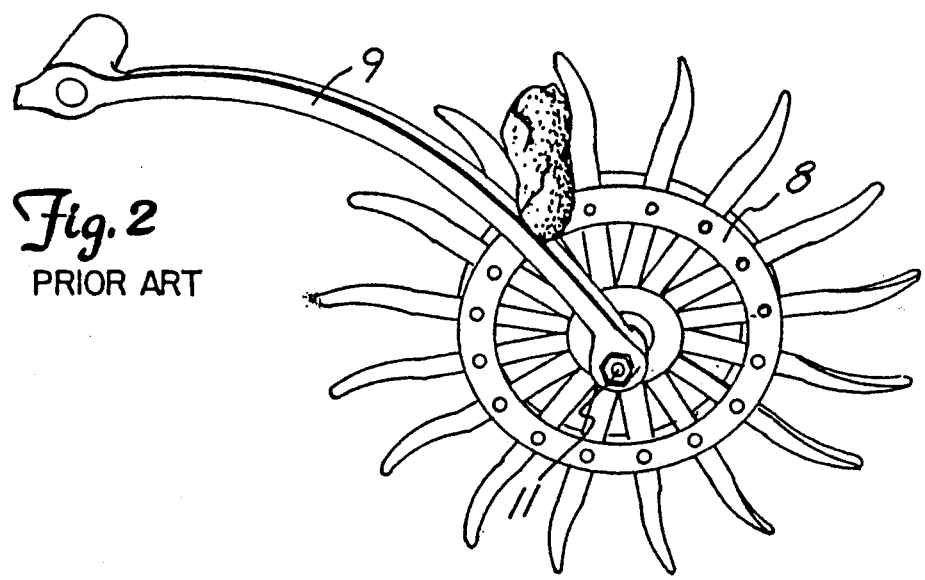
FIG. 2 is a side elevational view of the prior art rotary hoe wheel with a rock lodged in tines of the hoe wheel striking its corresponding support arm.
Figure 3:
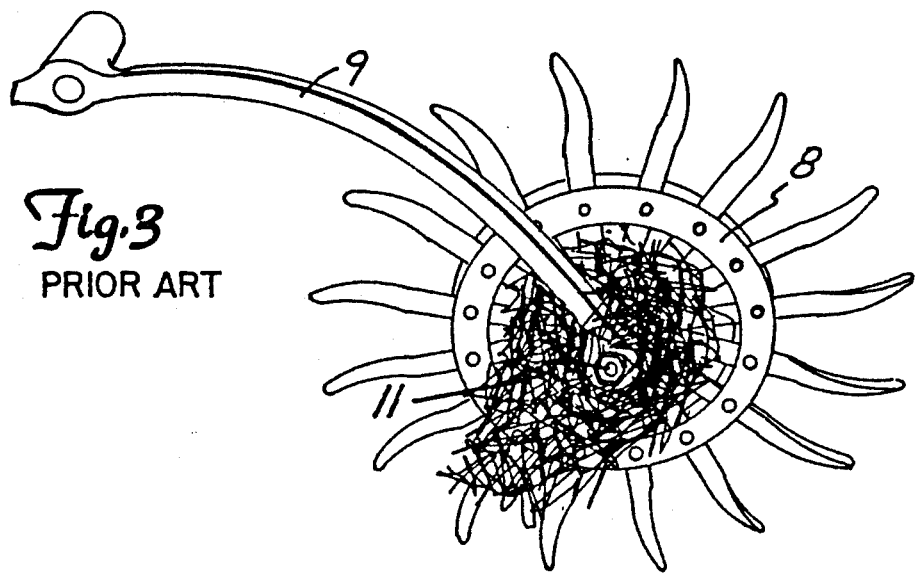
FIG. 3 is a side elevational view of a prior art rotary hoe wheel with trash wedged between a support arm and the hoe wheel.

A very common type of problem with the type of rotary hoes currently in use is that of bearing failure. Three main causes of bearing failure in the currently used rotary hoes are shown in FIGS. 1-3. FIG. 1 shows a prior art hoe wheel 8 mounted from an axle 11 on a support arm 9. The hoe wheel 8 is positioned close to the support arm 9 and barbed wire wrapped around the axle 11 as shown locks the hoe wheel 8 in place so it cannot rotate. FIG. 2 shows a prior art hoe wheel 8 with a rock from the field wedged between two tines of the hoe wheel 8 and abutting the support arm 9 which prevents the hoe wheel 8 from rotating. FIG. 3 shows a prior art hoe wheel 8 with trash from the field wedged between the hoe wheel 8 and its corresponding support arm 9. In each of these conditions the hoe wheel 8 will slide and dig a furrow.

Figure 4:
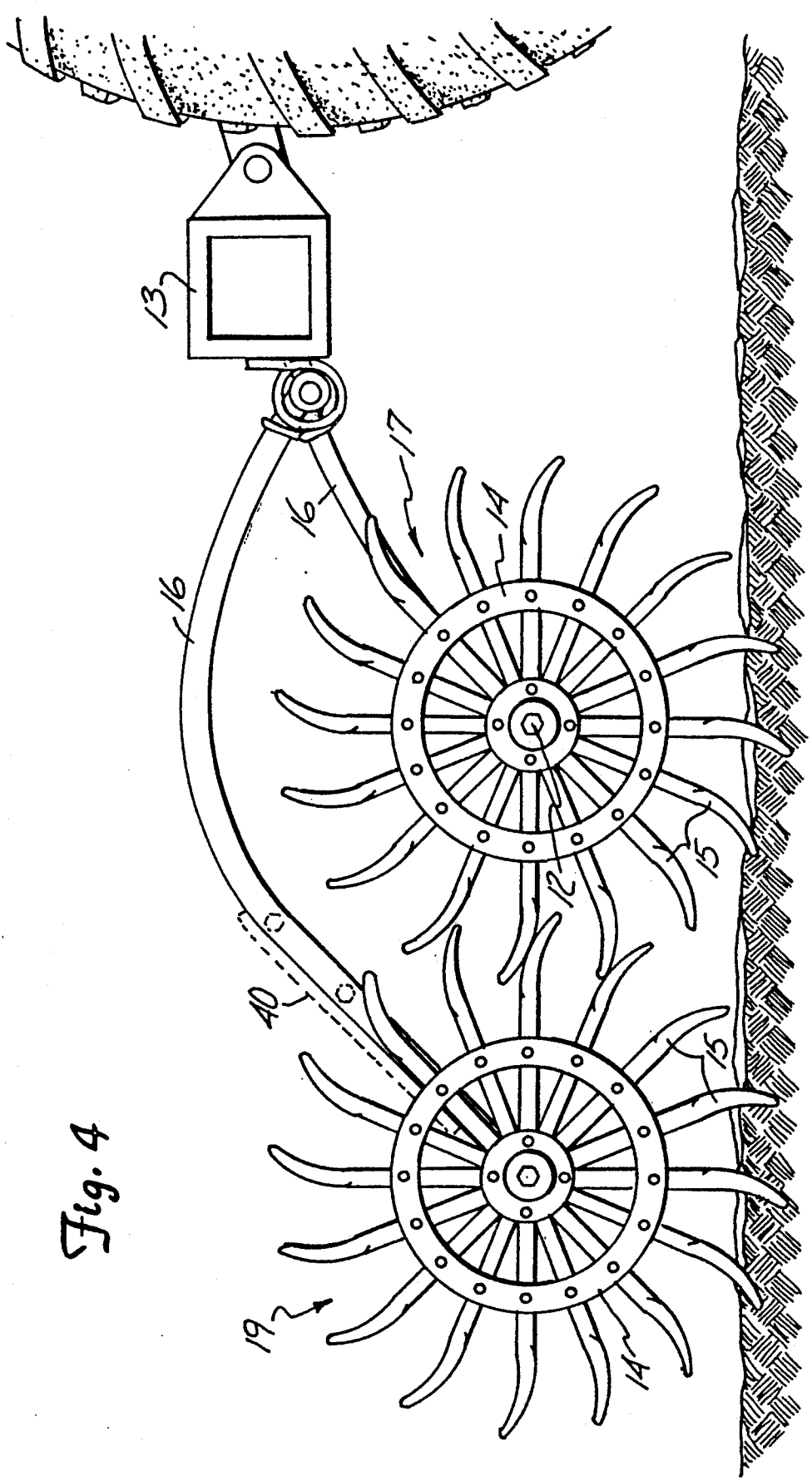
FIG. 4 is an elevational view of the present invention.
Figure 5:
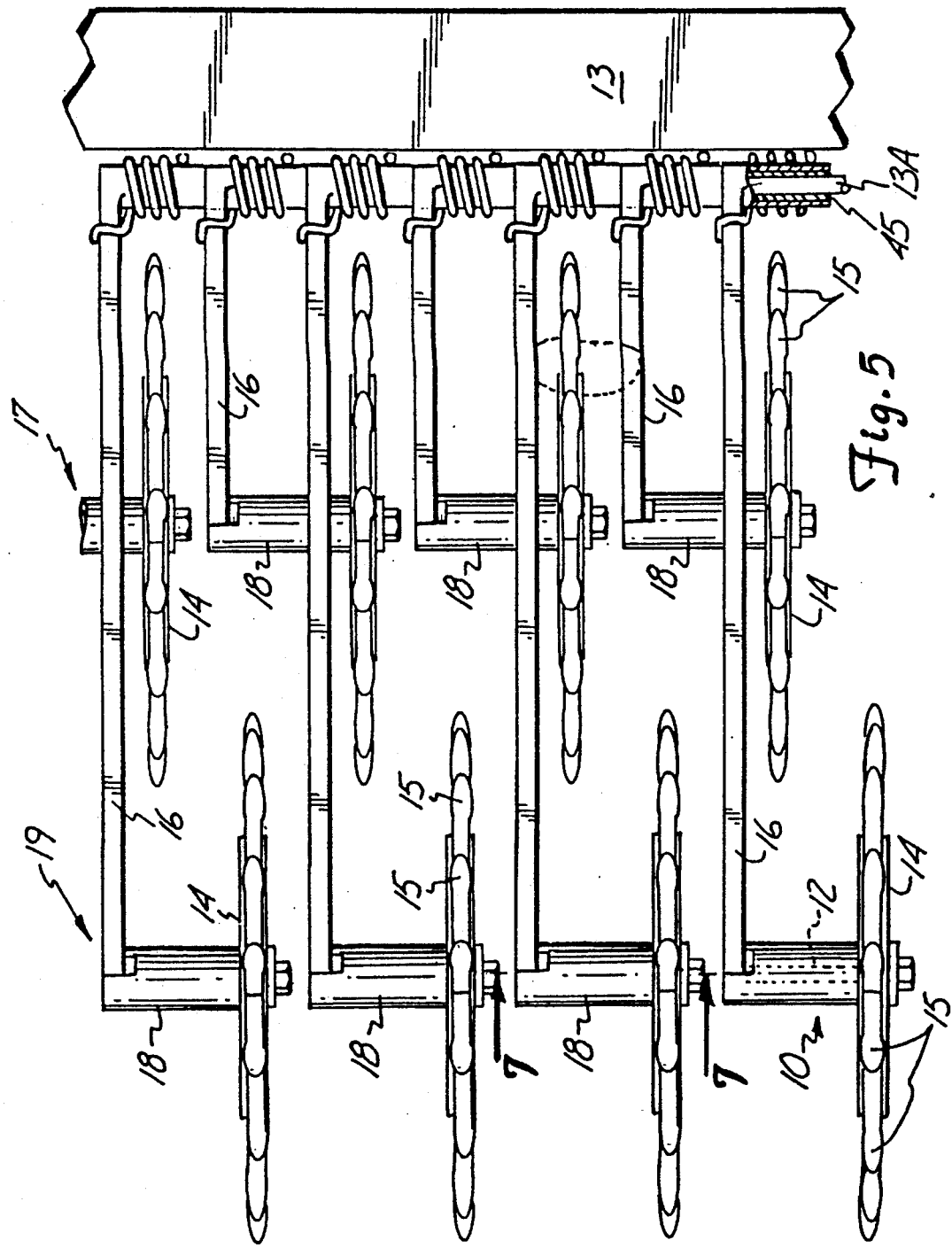
FIG. 5 is a top plan view of the present invention with a rock lodged in the tines of the rotary hoe wheel shown in dashed lines.

An improvement to no-till rotary hoes in accordance with the present invention is indicated generally at 10 in FIGS. 4 and 5. Hoe wheels 14 in the present invention are arranged in two rows, having a front row 17 in advance of a back row 19 as described in detail in U.S. Pat. No. 4,194,575 assigned to Yetter Manufacturing Company. The hoe wheels 14 are each attached to an independent support arm 16 which may attach to a tool bar 13 in a commonly known manner through a support rod 13A supported on tool bar 13. Preferably, the arms 16 are pivotally mounted on rod 13A using a replaceable bushing 45, as shown in FIG. 5, to reduce wear on the pivot hub of the support arms 16.

The improvement of the present invention comprises adding an elongated axle 12 which mounts hoe wheels 14 spaced laterally away from their corresponding support arms 16 and in close proximity to the adjacent support arm. This is done to eliminate or greatly reduce the weed, crop residue, and trash buildup from getting packed between the hoe wheel 14 and its corresponding support arm 16. The other reason for moving the wheel 14 away from the corresponding support arm 16 and into close proximity with the adjacent support arm is to provide for a self-cleaning function which will be discussed in greater detail later.

The improvement also comprises providing a spring-loaded protective sleeve 18 which covers the elongated axle 12. The sleeve 18 is spring loaded to maintain a positive, compression loaded frictional seal with a bearing or bushing 20 of each hoe wheel 14. The frictional seal is important to prevent twine, barbed wire, or other trash from wedging between the support arm 16 and bearing 20 causing increased stress and strain or uneven wear on bearing seals 23 thus wearing out the bearing seals 23. The frictional seal also provides a water and dust resistant barrier which helps prolong the wear life of the bearings 20 supporting the hoe wheels 14.

It should be understood that any type of hoe wheel may be utilized, such as rubber tipped hoe wheels, spring-loaded tines, wheels with multiple angled tines, or protected tines. The hoe wheel design is not crucial to the implementation of the present invention.

Figure 7:
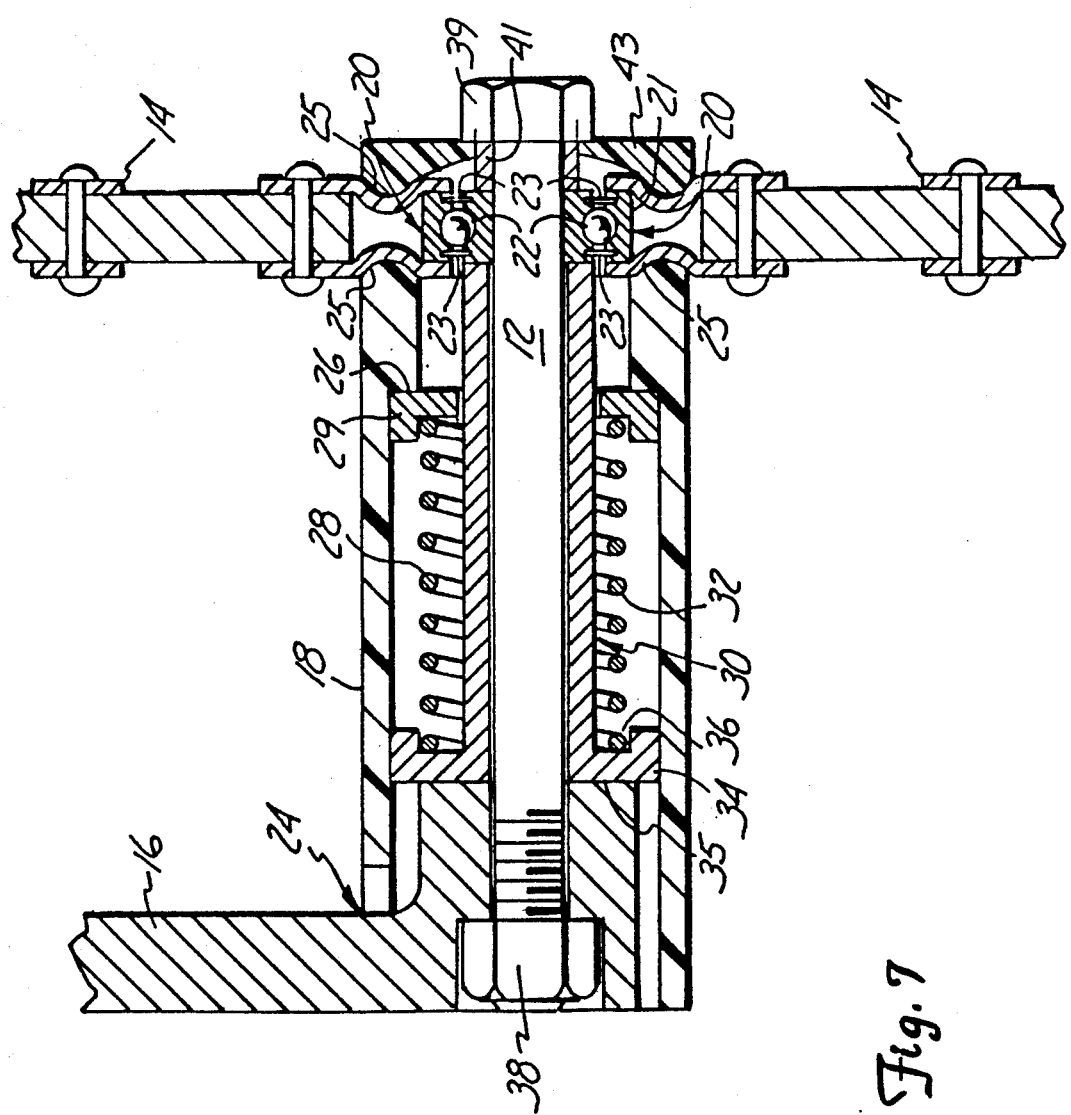
FIG. 7 is an enlarged sectional view taken along line 7—7 of FIG. 5.

The elongated axle 12 is utilized to move the hoe wheels 14 away from their corresponding support arms 16. The axle 12 of the present invention is, as shown, a six inch long bolt which moves the hoe wheel 14 approximately five and one quarter inches away from its corresponding support arm 16. Moving the hoe wheel 14 this far from its corresponding support arm 16 places it in close proximity to an adjacent support arm. The sealed ball bearing 20, as illustrated in FIG. 7, with the bearing seals 23 which is between an outer race 21 clamped on the rotary hoe wheel 14 and an inner race 22 held on the elongated axle 12 is used to support each hoe wheel 14. The axle 12 passes through a central hole in the hoe wheel 14.

To protect the elongated axle 12 and to protect the bearing 20 from becoming dusty and dirty and causing premature bearing failure because of damaged seals, a protective sleeve 18 is provided to encompass the axle 12. The protective sleeve 18 is spring loaded to maintain a compression frictional seal with outer flanges 25 of bearing 20 used for mounting the outer races 21 to the hoe wheel 14. The protective sleeve 18 is made from Schedule 80 PVC and has an inside diameter of two inches. It should be noted that any such protective material could be used for the sleeve 18, but a plastic or other low friction material should contact the flange 25. The protective sleeve 18 abuts the flanges 25 which are radially outside the bearing seals 23 to protect the bearing seals 23 as previously described.

Figure 6:
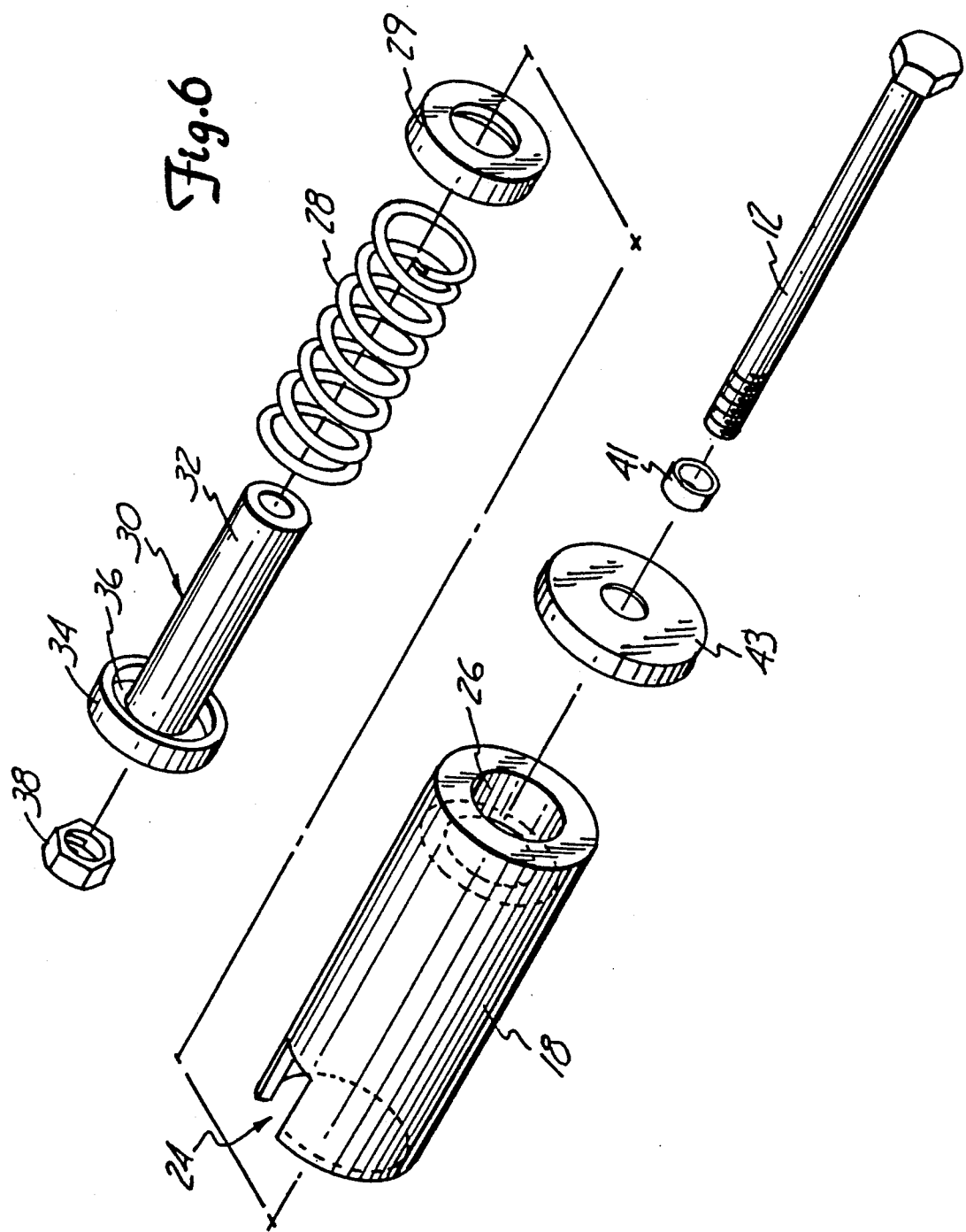
FIG. 6 is an exploded perspective view of a protective sleeve of the present invention.

An exploded view of the spring-loaded protective sleeve 18 is illustrated in FIG. 6. A notch 24 is cut out of the sleeve 18 to allow the protective sleeve 18 to slip over support arm 16 to keep the sleeve 18 from rotating. An inner shoulder (or clutch facing) 26 is provided on the interior of the sleeve 18. The shoulder 26, which may be a separately attached collar or, as in the illustrated embodiment, it may be formed into the protective sleeve 18, reduces the inside diameter of a portion of the protective sleeve 18 down to one and one-half inches. Spring 28 is provided to keep the protective sleeve 18 frictionally in contact with the hoe wheel 14 and provides approximately two to five pounds of compression force onto the flange 25 of bearing 20 of the hoe wheel 14.

A spring guide and spacer sleeve member 30 has an elongated sleeve portion 32 that fits over the axle 12, the sleeve 32 also has an annular head 34 with an annular channel or recess 36 surrounding the sleeve 32. The spring guide and spacer sleeve member 30 guides the spring 28 and keeps the spring 28 centered in the sleeve 18, as well as spacing the inner race 22 of bearing 20 out from the support arm 16 the proper amount. A retaining washer 29 has a flange forming a cup to receive and retain an outer end of the spring 28. The washer 29 is held axially in place against the shoulder 26 to react spring loads to urge the protective sleeve 18 against the bearing 20. A known nylon detent lock nut 38 is used to clamp a head 39 of the axle 12 against a sleeve 41 which in turn abuts the inner race 22 which then clamps the sleeve 32 and annular head 34 against a surface 35 of support arm 16 to retain the hoe wheel 14 in position.

The nut 38 must be capable of retaining the axle 12 in place in use.

A large protective washer 43 having a concave underside and a hole fits around the axle 12 and the sleeve 41. The protective washer 43 extends radially out from the axle 12 to provide the axle head 39 side of the hoe wheel 14 with similar water and dust resistance as the protective sleeve 18 side. The washer 43 is made from a similar pvc material as the protective sleeve 18 and the underside of the washer 43 is concave to provide a tight slightly loaded friction fit with the flange 25.

The spring 28 slides over the sleeve 32 of the spring guide and spacer sleeve member 30. One end of the spring 28 is retained in the annular channel 36 of the head 34 while the other end fits in the cup of the washer 29 which abuts the shoulder 26.

In operation, with the elongated axle 12 installed and the protective sleeve 18 installed, the present invention provides protection for the axle 12 and the bearing 20, and also creates a self-cleaning operation. When being pulled through a field, the hoe wheels 14 rotate causing a succession of tines 15 to penetrate the field surface. As the rotary hoe 10 moves across the field, twine and barbed wire may be wrapped around the protective sleeve 18. Because the protective sleeve 18 is not rotating, is of fairly large diameter as compared to the axle 12, is spring loaded, and forms a frictional seal with the bearing 20, the barbed wire or twine does not affect the bearing 20 operation at all. It can wrap around the protective sleeve 18 but causes no problems for the bearing seal 23. If the twine or barbed wire does wrap around the sleeve 18, it is easy to cut away and remove.

In no-till or minimum till situations, trash such as sunflower stalks or other crop residue from the field may also begin to build up in the tines 15 of the hoe wheels 14. When this occurs, the trash may begin to extend axially out the sides of the tines 15. Trash extending axially out the sides of the tines 15 is removed, or self-cleaned, when the trash strikes the nearest adjacent support arm 16 and is knocked from the tines 15. The trash in the present invention does not just wedge between the arm 16 and the associated hoe wheel 14 as in the previous rotary hoe systems because the nearest adjacent arm 16 is bouncing at a different frequency than that of the hoe wheel 14 with the trash, which tends to knock the trash off the tines 15.

A rock may also be lodged between the tines 15 of a rotary hoe wheel 14 as is shown in dashed lines in FIG. 5. In some prior rotary hoe designs, as were previously described, the rock would generally rotate until it struck its corresponding support arm. At this time, the hoe wheel would no longer rotate, and the rotary wheel would just plow dirt. The wheel and the support arm for that wheel would bounce up and down as one unit, and thus the rock would remain wedged between the tines 15 and stopped on the associated arm 16 until the operator dislodged the rock.

In the present invention, when a rock becomes lodged between the tines 15 of the hoe wheel 14, the hoe wheel 14 rotates until it contacts the nearest adjacent support arm 16. Each set of support arms 16 and hoe wheel 14 act independent of each other, and thus, the hoe wheel 14 with the rock lodged may be plowing dirt and bouncing due to the terrain it is traversing while the adjacent hoe wheel 14 and support arm 16 will be rotating and bouncing at different times due to the terrain it is traversing. The different rates and times of bounces causes the adjacent support arm 16 to bounce into the rock, thus dislodging the rock. To protect the operator from flying rocks, root balls, dirt clumps, and other foreign material, an enlarged and angled rock cage may be attached to the tool bar.

Figure 8:
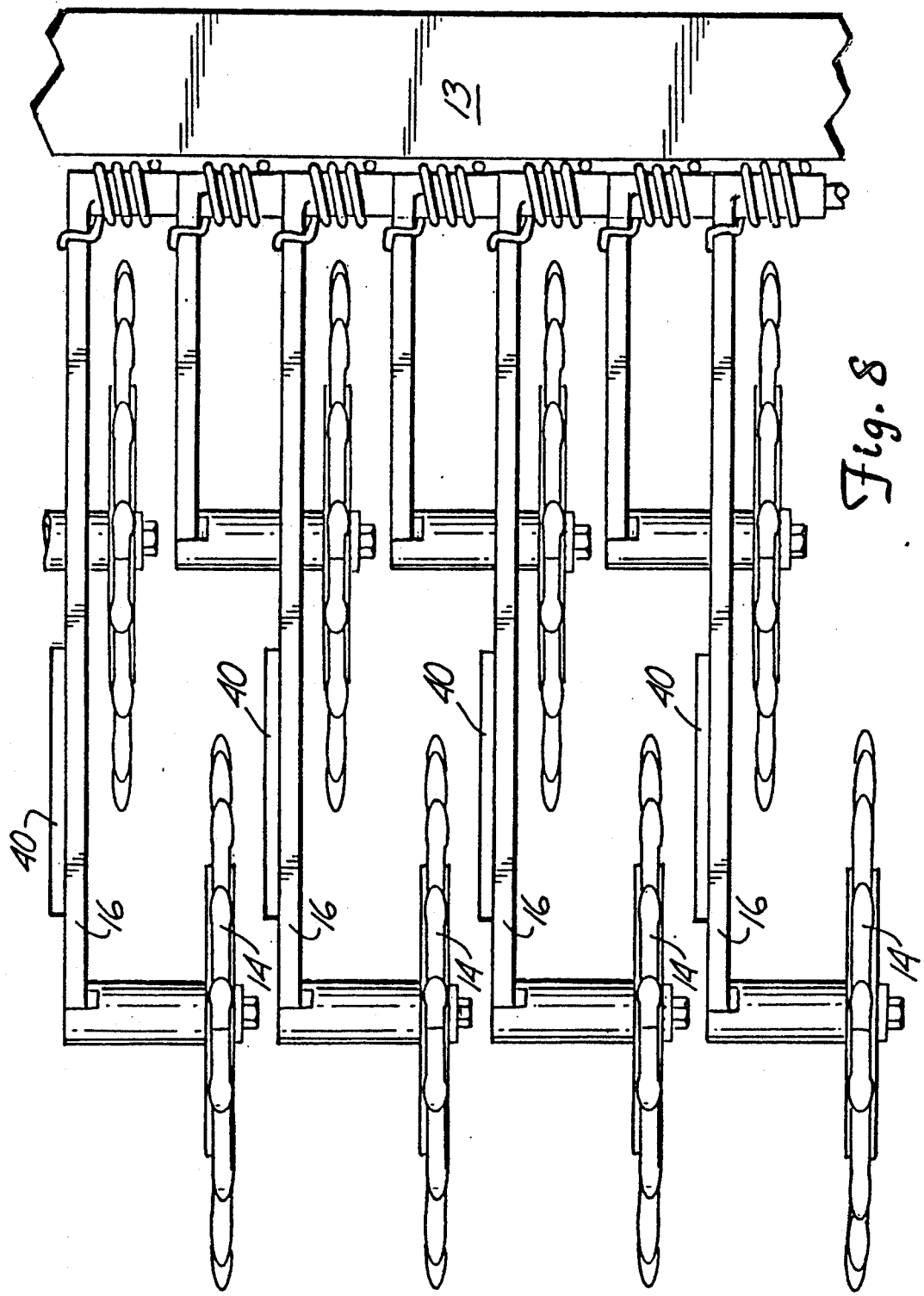
FIG. 8 is a rear elevational view of another preferred embodiment of the present invention.

In another preferred embodiment, an 11 inch resharpenable and reversible knife 40 is mounted to or adjacent the back edges of the back row 19 of support arms 16. This embodiment has similar elements to the previous embodiment and as such, like elements are correspondingly labeled. The knife 40, which is illustrated in dashed lines in FIG. 4 and in FIG. 8, is mounted to be approximately ⅜ of an inch from its nearest hoe wheel 14. When trash such as corn or sunflower residue begins to bind in the tines 15, the trash is carried by the hoe wheel 14 around its path of travel up past the nearest support arm 16 where the knife 40 will cut the trash. The knife 40 is flush mounted on the arm 16 with counter sunk bolts (not shown) to prevent trash from catching on the bolts.

Although the present invention has been described with reference to preferred embodiments, workers skilled in the art will recognize that changes may be made in form and detail without departing from the spirit and scope of the invention.

What is claimed is:

1. An apparatus for mounting a rotary earthworking implement assembly including a bearing having a stationary portion and a rotating portion onto a support arm adapted for attachment to a tool bar comprising:
    an elongated axle between each earthworking implement and a corresponding support arm for supporting such rotating implement assembly through the bearing for rotation on the axle, the rotating implement assembly being laterally spaced from the support arm; and
    a non rotating rigid sleeve substantially surrounding the axle and having an end frictionally abutting a rotating portion of the implement assembly radially outward from the bearing as the implement rotates.

2. The apparatus as in claim 1 wherein the apparatus includes means for spring loading the rigid sleeve against the implement assembly.

3. The apparatus as in claim 2 wherein the means for spring loading comprises a spring having a first and a second end, one end bearing against the respective support arm the other end engaging a portion of the rigid sleeve.

4. The apparatus as in claim 3 wherein the rigid sleeve contains a spring guide and spacer sleeve member comprising a sleeve having a head with an annular channel wherein the spring slidably mounts over the sleeve and the first end of the spring seats in the annular channel of the head, the sleeve abuts on the implement assembly to space the earthworking implement nearer an adjacent support arm than its corresponding support arm.

5. The apparatus as in claim 4 wherein the spring loaded rigid sleeve has an inner shoulder.

6. The apparatus as in claim 5 wherein a retaining member which abuts the inner shoulder of the rigid sleeve holds the second end of the spring.

7. The apparatus as in claim 1 further including a protective washer on an opposite side of the earthworking implement from the rigid sleeve having a sliding sealing engagement with the implement assembly.

8. The apparatus as in claim 1 wherein the rigid sleeve is made of a rigid plastic.

9. The apparatus as in claim 1 further including cutting means mounted to the support arms having a cutting edge positioned to engage and cut residue or trash caught in an adjacent earthworking implement and carried across the cutting means as the rotary implement rotates.

10. An improvement for rotating earthworking implements arranged into rows having a first row in advance of a second row, each implement being supported on a support arm which is attached to a tool bar, the improvement comprising:

an elongated axle between each implement and a corresponding support arm, each elongated axle laterally spaces each implement in the first row nearer an adjacent support arm for the first row than its corresponding support arm for the first row and laterally spaces the implements in the second row nearer an adjacent support arm for the second row than its corresponding support arm for the second row; and means for protecting the elongated axle and a bearing, wherein the means for protecting the elongated axle and the bearing comprises a spring loaded sleeve which frictionally abuts the implement at a location radially outwardly from the bearing on the implement as the implement rotates, wherein the sleeve is of substantially fixed length.

11. The improvement as in claim 10 wherein the spring loaded sleeve has a spring having a first end and a second end, one end bearing against the respective support arm the other end engaging a portion of the sleeve.

12. The improvement as in claim 11 wherein the sleeve contains a spring guide and spacer sleeve member comprising a sleeve having a head with an annular channel wherein the spring slidably mounts over the sleeve and the first end of the spring seats in the annular channel of the head.

13. The improvement as in claim 11 wherein the spring loaded sleeve has an inner shoulder.

14. The improvement as in claim 13 wherein a retaining member which abuts the inner shoulder of the sleeve holds the second end of the spring.

15. The improvement as in claim 14 wherein the means for protecting the elongated axle and the bearing on the implement is made of plastic.

16. The improvement as in claim 10 further including a protective washer for protecting the bearing on an opposite side of the earthworking implement from the means for protecting the elongated axle and bearing.

17. An improvement for rotating earthworking implements arranged into rows having a first row in advance of a second row, support arm means for rotatably supporting each implement for working, the improvement comprising an elongated axle between each implement and the corresponding support arm means, the elongated axle for each implement laterally spaces the respective implement in the first row nearer an adjacent support arm means in the first row than the corresponding support arm means for the respective implement in the first row, and laterally spaces the respective implements in the second row nearer an adjacent support arm means in the second row than the corresponding support arm means for the respective implement in the second row.

18. The improvement as in claim 17 including cutting means mounted to the support arm means for the second row having a cutting edge positioned to engage and cut trash carried across the cutting means from an adjacent implement in the second row as the rotating implement rotates.

19. An improvement for rotating earthworking implements arranged into rows having a first row in advance of a second row, support arm means for rotatably supporting each implement for working, the improvement comprising an elongated axle between each implement and a corresponding support arm means, each elongated axle laterally spaces the implements in the first row nearer an adjacent support arm means for the first row than its corresponding support arm means for the first row and laterally spaces each implement in the second row nearer an adjacent support arm means for the second row than its corresponding support arm means for the second row.

* * * * *